United States Patent
Tanaka et al.

(10) Patent No.: US 7,729,580 B2
(45) Date of Patent: Jun. 1, 2010

(54) WAVEGUIDE TYPE OPTICAL DEVICE AND MANUFACTURING METHOD OF THE WAVEGUIDE TYPE OPTICAL DEVICE

(75) Inventors: Kazuhiro Tanaka, Kawasaki (JP); Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/605,282

(22) Filed: Nov. 29, 2006

(65) Prior Publication Data

US 2008/0069499 A1 Mar. 20, 2008

(30) Foreign Application Priority Data

Sep. 14, 2006 (JP) .............................. 2006-249866

(51) Int. Cl.
*G02B 6/30* (2006.01)
*G02B 6/10* (2006.01)

(52) U.S. Cl. .......................... 385/49; 385/129; 385/132

(58) Field of Classification Search .................. 385/49, 385/129–132
See application file for complete search history.

(56) References Cited

U.S. PATENT DOCUMENTS

| | | | | |
|---|---|---|---|---|
| 5,572,619 A | * | 11/1996 | Maruo et al. ................ 385/143 |
| 5,896,484 A | * | 4/1999 | Borrelli et al. .............. 385/132 |
| 6,103,344 A | * | 8/2000 | Ota et al. ..................... 428/172 |
| 6,389,209 B1 | * | 5/2002 | Suhir .......................... 385/129 |
| 6,535,655 B1 | * | 3/2003 | Hasui et al. .................... 385/11 |
| 6,580,842 B1 | * | 6/2003 | Hehlen et al. ................. 385/11 |
| 6,683,376 B2 | * | 1/2004 | Sawada et al. .............. 257/692 |
| 7,172,344 B2 | * | 2/2007 | Nishihara et al. ............. 385/65 |
| 2002/0044744 A1 | * | 4/2002 | Diemeer ....................... 385/50 |
| 2003/0061836 A1 | * | 4/2003 | Higuchi et al. ................ 65/386 |
| 2004/0001684 A1 | * | 1/2004 | Korenaga et al. ........... 385/132 |
| 2004/0120650 A1 | * | 6/2004 | Tatehata et al. ............... 385/50 |
| 2006/0051020 A1 | * | 3/2006 | Moy et al. ..................... 385/33 |
| 2007/0019920 A1 | * | 1/2007 | Tanaka et al. ............... 385/137 |

FOREIGN PATENT DOCUMENTS

| | | |
|---|---|---|
| JP | 8-313758 | 11/1996 |
| JP | 2782931 | 5/1998 |
| JP | 2000-28979 | 1/2000 |

\* cited by examiner

*Primary Examiner*—Uyen-Chau N Le
*Assistant Examiner*—Rhonda S Peace

(57) ABSTRACT

A waveguide type optical device includes a substrate where a waveguide is formed; a supplemental plate connected on the substrate by using an adhesive; and a groove forming part formed by cutting through the supplemental plate so as to reach the substrate and cut the waveguide, the groove forming part being where a functional thin film is inserted. The supplemental plate and the waveguide adhere to each other or come close to each other in a range not influencing a mode of light.

7 Claims, 11 Drawing Sheets

WAVEGUIDE TYPE OPTICAL DEVICE AND MANUFACTURING METHOD OF THE WAVEGUIDE TYPE OPTICAL DEVICE

BACKGROUND OF THE INVENTION

1. Field of the Invention

The present invention generally relates to waveguide type optical devices used for optical communication and manufacturing methods of the waveguide type optical devices. More specifically, the present invention relates to a waveguide type optical device where a functional thin film is inserted in a groove forming part formed so as to cross a waveguide layer formed in a substrate and a manufacturing method of the waveguide type optical device.

2. Description of the Related Art

Generally, electro-optical effect type optical control elements used in optical waveguides having a structure where metal such as titanium (Ti) or the like is diffused in a crystal of lithium niobate ($LiNbO_3$) have been known as waveguide optical devices. While this waveguide type optical device has an extremely high response speed, change of refractive index differs depending on polarization directions of lights even if the same voltage or electrical field is applied to the wave guide. Hence, the operation of the waveguide type optical device depends on the polarization directions of lights. As a waveguide type optical device solving such polarization dependence problem, Japanese Laid-Open Patent Application Publication No. 2000-28979 discloses a structure where a functional thin film (thin film type wavelength plate) can be inserted in the waveguide.

FIG. 1 is a perspective view of a related art waveguide type optical device 1A. As shown in FIG. 1, the waveguide type optical device 1A has a structure where a waveguide 3 is formed by diffusion of titanium (Ti) in a substrate 2 made of lithium niobate ($LiNbO_3$) and a thin film insertion groove forming part 4 is formed in the substrate 2 so as to cut the a waveguide 3. A functional thin film 5 such as a thin film type wavelength plate is inserted in the thin film insertion groove forming part 4. Under this structure, it is possible to make polarization non-independency of the waveguide type optical device 1A.

On the other hand, as discussed above, in the waveguide type optical device 1A where the thin film insertion groove forming part 4 is formed in the substrate 2, chipping may happen in the substrate 2 including the waveguide 3 when the thin film insertion groove forming part 4 is formed so that a propagation characteristic of light may be degraded. Because of this, as disclosed in Japanese Laid-Open Patent Application Publication No. 8-313758, in order to prevent chipping in the substrate 2 when the thin film insertion groove forming part 4 is formed, a structure where a process supplemental plate called a fixture is fixed to an upper part of the substrate by adhesive has been suggested.

FIG. 2 is a cross-sectional and enlarged view of the vicinity of the thin film insertion groove forming part 4. More specifically, FIG. 2 shows a waveguide type optical device 1B having a process supplemental plate 6. As shown in FIG. 2, the process supplemental plate 6 is fixed to the substrate 2 including a position where the waveguide 3 is formed by using an adhesive 7. After the process supplemental plate 6 is fixed, the thin film insertion groove forming part 4 is formed by cutting through the process supplemental plate 6 so as to reach the substrate 2, so that chipping is prevented from being generated in the waveguide 3. Thus, the propagation characteristic of light is not degraded.

However, in the waveguide type optical device 1B shown in FIG. 2 having a structure where the process supplemental plate 6 is adhered to the substrate 2 including the waveguide 3 by using the adhesive 7, a layer of the adhesive 7 is formed between the substrate 2 and the process supplemental plate 6. In a case where the adhesive 7 exists in the waveguide type optical device 1B, light propagated in the waveguide type optical device 1B is influenced by the refractive index of the adhesive 7.

A characteristic indicated by an arrow A in FIG. 2 is an intensity (mode) of the light propagated in the waveguide type optical device 1B. Since the refractive index of the adhesive 7 is lower than refractive indexes of the substrate 2 and the waveguide 3, as shown in FIG. 2, the light is locked up at the side of the substrate 2. If such a light enters the thin film insertion groove forming part 4, the light spreads when reaching from the waveguide 3 to the functional thin film 5, so that coupling loss of light when the light reenters the waveguide 3 after passing through the functional thin film 5 becomes large.

In order to solve this problem, the adhesive layer 7 may be made extremely thin. However, the thickness of the adhesive 7 influences the mechanical strength for fixing the process supplemental plate 6 to the substrate 2. If the adhesive 7 is thin, the process supplemental plate 6 may be delaminated from the substrate 2 when the thin film insertion groove forming part is formed and therefore the process supplemental plate 6 may not work as a supplemental plate.

SUMMARY OF THE INVENTION

Accordingly, embodiments of the present invention may provide a novel and useful waveguide type optical device and manufacturing method of the waveguide type optical device solving one or more of the problems discussed above.

More specifically, the embodiments of the present invention may provide a waveguide type optical device, in which device the coupling loss of wave-guided light can be reduced and a supplemental plate can be prevented from being delaminated from a substrate even if a groove forming part is formed in a wave guide, and a manufacturing method of the waveguide type optical device One aspect of the present invention may be to provide a waveguide type optical device, including a substrate where a waveguide is formed; a supplemental plate connected on the substrate by using an adhesive; and a groove forming part formed by cutting through the supplemental plate so as to reach the substrate and cut the waveguide, the groove forming part being where a functional thin film is inserted; wherein the supplemental plate and the waveguide adhere to each other or come close to each other in a range not influencing a mode of light. In the above-mentioned waveguide type optical device, a concave part may be formed in at least one of a position of the substrate excluding a forming position of the waveguide and a position of the supplemental plate excluding a position facing the waveguide; and the adhesive may be provided in the concave part so that the substrate and the supplemental plate are adhered to and fixed to each other. The supplemental plate may be made of material having the same coefficient of thermal expansion and refractive index as a material of the substrate.

Other aspect of the present invention may be to provide a waveguide type optical device, including a substrate where a waveguide is formed; a supplemental plate connected on the substrate by using an adhesive; and a groove forming part formed by cutting through the supplemental plate so as to reach the substrate and cut the waveguide, the groove forming part being where a functional thin film is inserted; wherein the distance ΔW between the waveguide and the supplemental plate is defined as $0 \leq \Delta W \leq 0.08 \times \lambda$ where "λ" is defined as a wavelength of light propagated in the waveguide.

According to the above-mentioned waveguide type optical device, since the supplemental plate and the wave guide adhere to each other or come close to each other in a range not influencing a mode (intensity) of light, influence by the adhesive can be removed. Therefore, when the light is propagated in the waveguide type optical device, a mode configuration of the light is spread in a supplemental plate area. Because of this, spread of the light in the grove forming part becomes small and thereby the coupling loss when the light is incident on the opposite side waveguide after passing the groove forming part (functional thin film) can be reduced.

Other aspect of the present invention may be to provide a manufacturing method of a waveguide type optical device, including the steps of: forming a waveguide in a substrate; forming a concave part in one of a position of the substrate excluding a forming position of the waveguide and a position of a supplemental plate excluding a position facing the waveguide; providing an adhesive in the concave part; adhering and fixing the substrate and the supplemental plate by using the adhesive so that the supplemental plate and the waveguide adhere to each other or come close to each other in a range not influencing a mode of light; and forming a groove forming part where a functional thin film is inserted by cutting through the supplemental plate so as to reach the substrate and cut the waveguide.

Other objects, features, and advantages of the present invention will be come more apparent from the following detailed description when read in conjunction with the accompanying drawings.

DETAILED DESCRIPTION OF THE PREFERRED EMBODIMENTS

A description is given below, with reference to the FIG. 3 through FIG. 12 of embodiments of the present invention.

Figure 1:
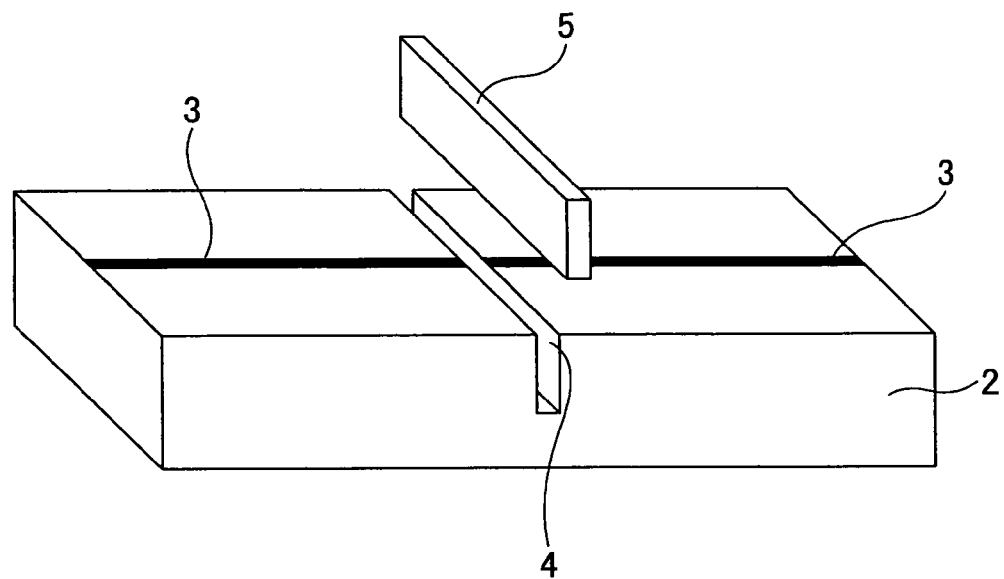
FIG. 1 is a perspective view of a related art waveguide type optical device.
Figure 2:
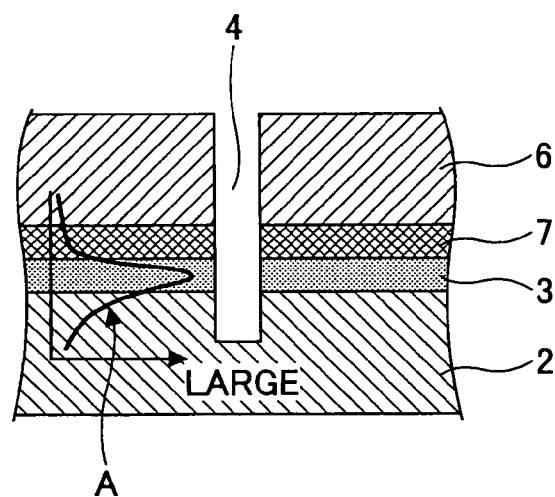
FIG. 2 is a cross-sectional and enlarged view of the vicinity of a thin film insertion groove forming part of the related art waveguide type optical device.
Figure 3:
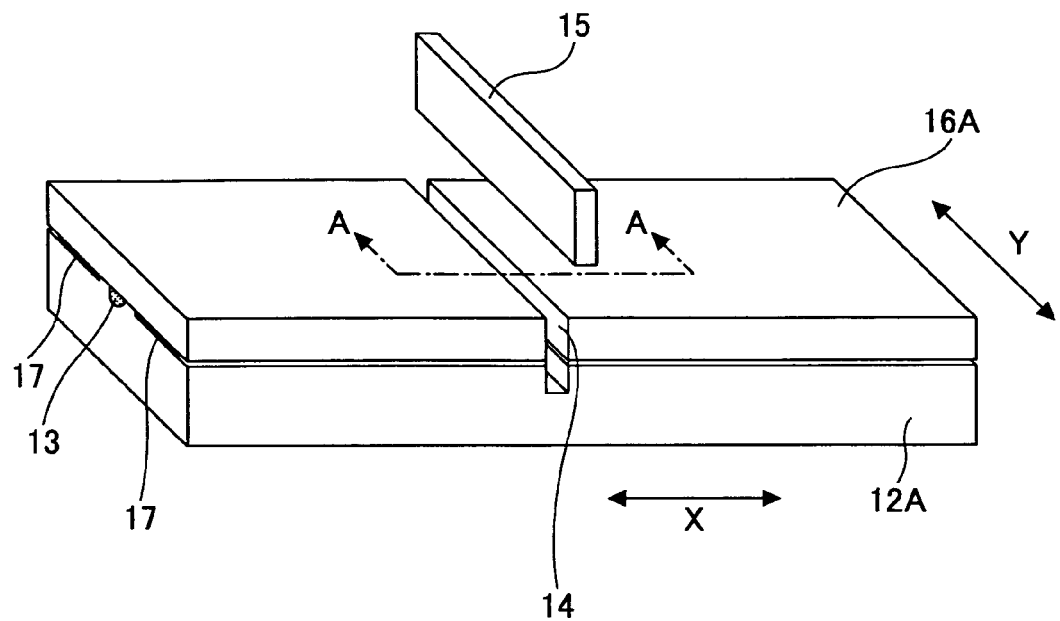
FIG. 3 is a perspective view of a waveguide type optical device of a first embodiment of the present invention.
Figure 4:
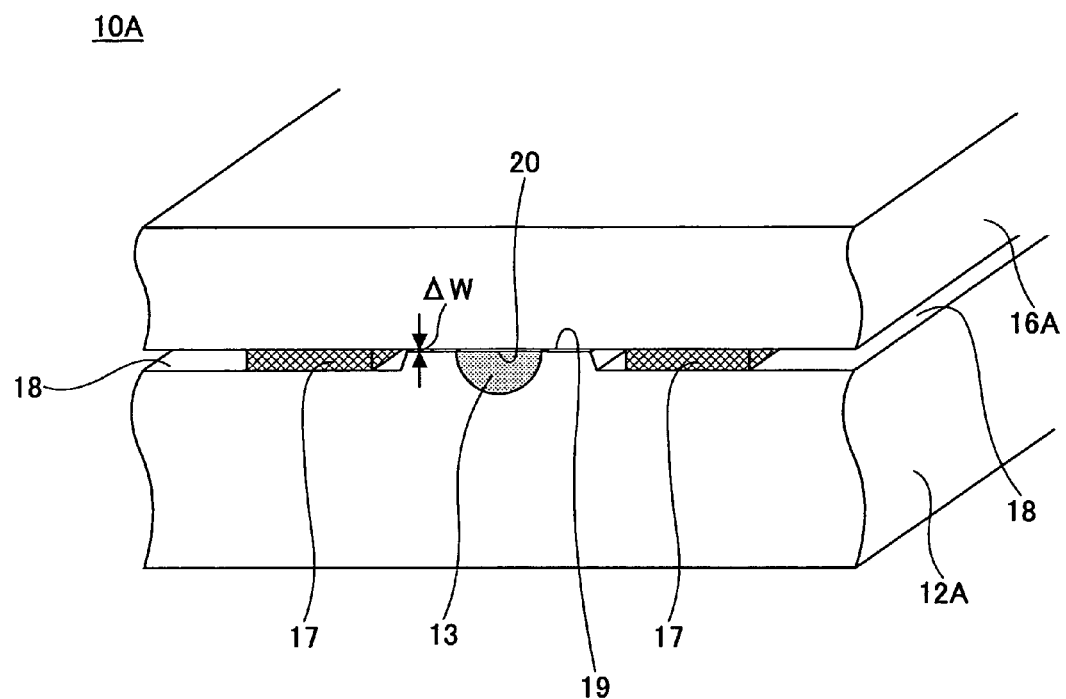
FIG. 4 is a perspective and enlarged view of a main part of the waveguide type optical device of the first embodiment of the present invention.
Figure 5:
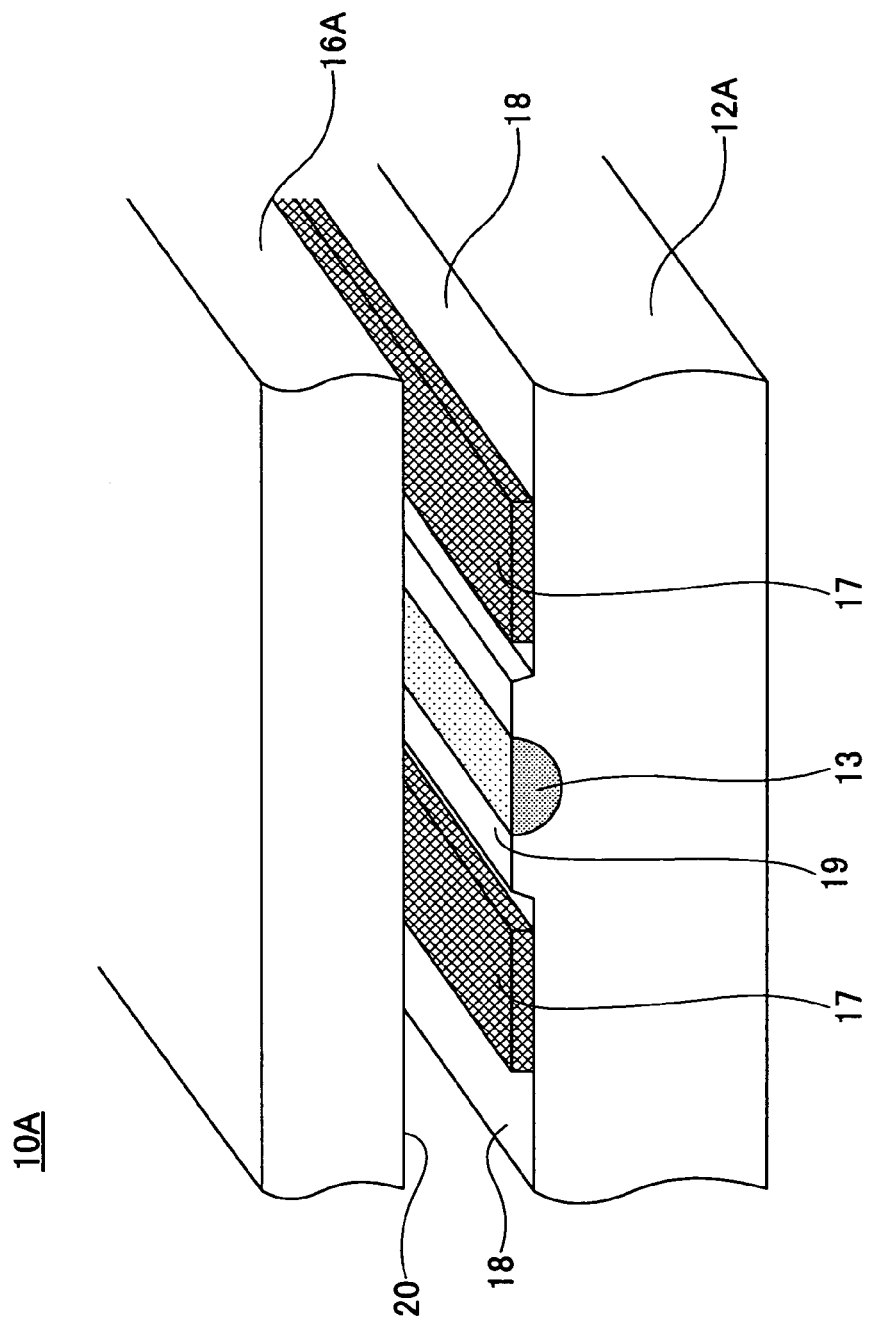
FIG. 5 is an exploded perspective and enlarged view of the main part of the waveguide type optical device of the first embodiment of the present invention.
Figure 6:
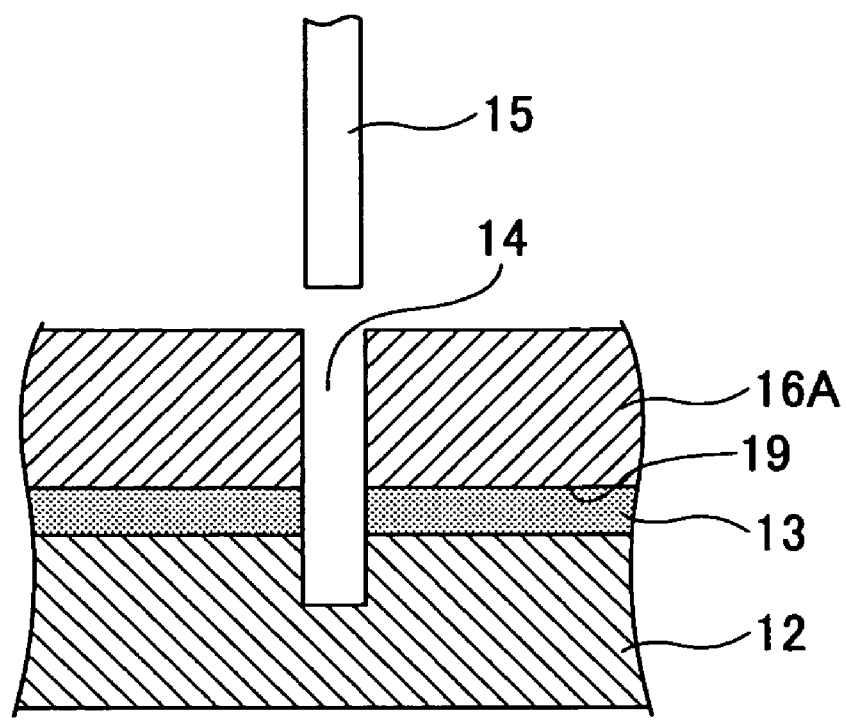
FIG. 6 is a cross-sectional view taken along a line A-A in FIG. 3.

FIG. 3 through FIG. 6 are views for explaining a waveguide type optical device 10A of a first embodiment of the present invention. More specifically, FIG. 3 is a perspective view of the waveguide type optical device 10A of the first embodiment of the present invention. FIG. 4 is a perspective and enlarged view of a main part of the waveguide type optical device 10A of the first embodiment of the present invention. FIG. 5 is an exploded perspective and enlarged view of the main part of the waveguide type optical device 10A of the first embodiment of the present invention. FIG. 6 is a cross-sectional view taken along a line A-A in FIG. 3.

The waveguide type optical device 10A includes a substrate 12A, a waveguide 13, a thin film insertion groove forming part 14, a process supplemental plate 16A called a fixture, an adhesive 17, and others. The waveguide type optical device 10A has a structure where a functional thin film 15 can be inserted in the thin film insertion groove forming part 14 for implementing polarization non-independence or polarization dispersion compensation in, for example, an LN modulator or a variable delay device (DGD device).

The substrate 12A is a flat plate state substrate made of lithium tantalate or lithium niobate ($LiNbO_3$, hereinafter "LN") having an electro-optical effect. In this embodiment, LN is used as the substrate 12A material. In the center position in a width direction indicated by an arrow Y in FIG. 3 of a waveguide forming surface 19 of the substrate 12A, the waveguide 13 is formed so as to extend in a longitudinal direction indicated by an arrow X in FIG. 3. See FIG. 5. The waveguide 13 is formed by, for example, thermally diffusing titanium (Ti) in the substrate 12A made of LN.

In addition, as shown in FIG. 4, concave parts 18 are formed at both sides in the width direction of the waveguide forming surface 19 where the waveguide 13 of the substrate 12A is formed. The depth of the concave part 18 from the waveguide forming surface 19 is, for example, approximately 2 μm. Thus, since the concave parts 18 are formed at both sides of the substrate 12A, the waveguide forming surface 19 where the waveguide 13 is formed relatively projects toward the upper surface of the concave parts 18. In addition, the adhesive 17 configured to connect the substrate 12A and the process supplemental plate 16A is provided inside the concave parts 18.

The process supplemental plate 16A is a flat plate substrate. Therefore, a facing surface 20 of the process supplemental plate 16A facing the waveguide 13 is a flat surface. In addition, in this embodiment, a substrate made of lithium niobate ($LiNbO_3$, namely LN) that is the same as the material of the substrate 12A is used as the process supplemental plate 16A. However, the present invention is not limited to this example. That is, other material can be used for the process supplemental plate 16A as long as the material has a refractive index and coefficient of thermal expansion similar with those of the substrate 12A and mechanical strength sufficient for forming this film insertion groove forming part 14.

As shown in FIG. 3, the process supplemental plate 16A is provided on the entirety of a forming area of the waveguide 13 of the substrate 12A. In addition, the process supplemental plate 16A is adhered and fixed to the substrate 12A by the adhesive 17 provided inside the concave parts 18. Thus, since the process supplemental plate 16A fixed to the substrate 12A is made of LN having the same refractive index as the substrate 12A as discussed above, light can be propagated inside the process supplemental plate 16A. Furthermore, since the substrate 12A and the process supplemental plate 16A have the same coefficient of thermal expansion, it is possible to prevent the generation of cracks or delamination in the adhesive layer 17 due to difference of coefficients of thermal expansion. In addition, the process supplemental plate 16A functions as a supplemental plate of the substrate 12A when the thin film insertion groove forming part 14 is formed. Therefore, it is possible to prevent chipping from occurring in the substrate 12A including the waveguide 13 when the thin film insertion groove forming part 14 is formed.

Considering the propagation of light in the waveguide type optical device 10A, it is preferable to use a substance having a refractive index similar to that of the substrate 12A as the adhesive 17 adhering the substrate 12A and the process supplemental plate 16A to each other. However, actually, the refractive index of the adhesive is lower than that of LN and there is no adhesive having the refractive index similar to that of the LN. In addition, in a case where the adhesive 17 having the different refractive index from that of the LN is provided in a thick layer between the waveguide and the process supplemental plate, the light is locked up at the substrate side. Therefore, as discussed above, when the light passes through the functional thin film provided in the thin film insertion groove forming part, coupling loss of the light becomes large.

As shown in FIG. 3 and FIG. 6, the thin film groove forming part 14 is formed starting from the process supplemental plate 16A and extending into the substrate 12A. Therefore, the waveguide 13 formed in the waveguide forming surface 19 facing the process supplemental plate 16A of the substrate 12A is cut by the thin film insertion groove forming part 14. The functional thin film 15 is inserted in the thin film insertion groove forming part 14. The functional thin film 15 is, for example, a ½ wavelength plate for polarization conversion. In the state where the functional thin film 15 is inserted in the thin film insertion groove forming part 14, the functional thin film 15 is optically connected to the waveguide 13.

Here, the distance between the waveguide forming surface 19 in a forming position of the waveguide 13 and the process supplemental plate 16A is discussed. In the waveguide type optical device 10A of the embodiment of the present invention, the concave parts 18 are formed at both sides of the forming position of the waveguide 13 on the waveguide forming surface 19 of the substrate 12A. The substrate 12A and the process supplemental plate 16A are adhered and fixed to each other by the adhesive 17 provided inside the concave part 18. Under this structure, the adhesive 17 can be made thick and the waveguide forming surface 19 where the waveguide 13 is formed and the facing surface of the process supplemental plate 16A can be adhered to each other.

More specifically, the thickness of the adhesive 17 can be substantially equal to the depth of the concave part 18, for example approximately 2 μm. In addition, the waveguide 13 and the facing surface 20 of the process supplemental plate 16A can be adhered to each other or come close to each other in a range not influencing the mode (intensity) of the light. More specifically, the distance indicated by an arrow ΔW between the waveguide 13 and the facing surface 20 of the process supplemental plate 16A is defined as $0 \leq \Delta W \leq 0.08 \times \lambda$ wherein "λ" is defined as a wavelength of light propagated in the waveguide 13. This distance ΔW can be changed where the depth of the concave part 18, the con-figuration of the concave part 18, the amount of the adhesive 17, viscosity of the adhesive 17, and others are parameters.

While the concave part 18 is provided in the substrate 12A and the adhesive 17 is provided in the concave part 18 in the above-discussed embodiment, the concave part may be formed in the process supplemental plate 16A and the adhesive may be provided in the concave part.

Next, a second embodiment of the present invention is discussed.

Figure 7:
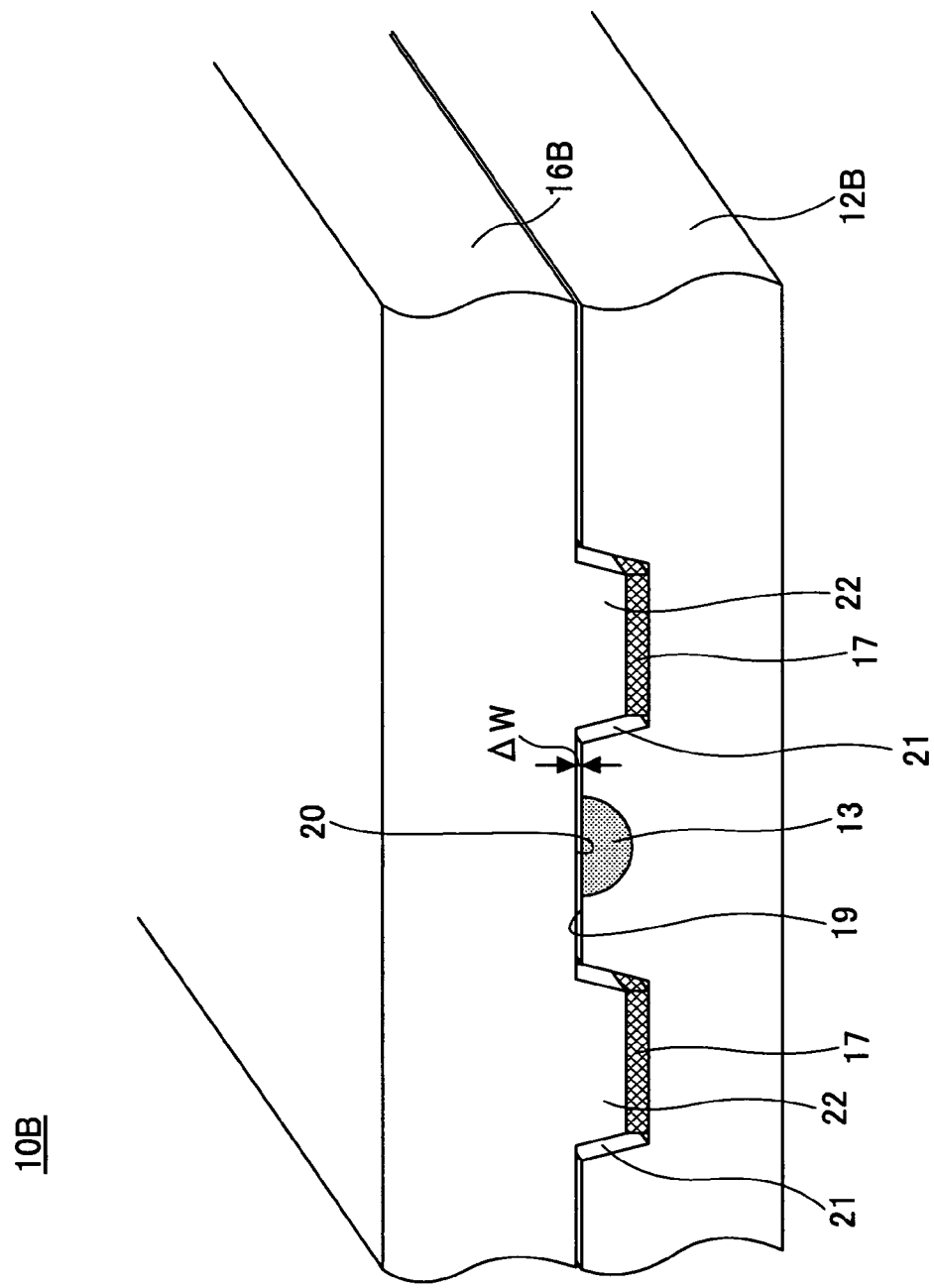
FIG. 7 is a perspective and enlarged view of a main part of a waveguide type optical device of a second embodiment of the present invention.
Figure 8:
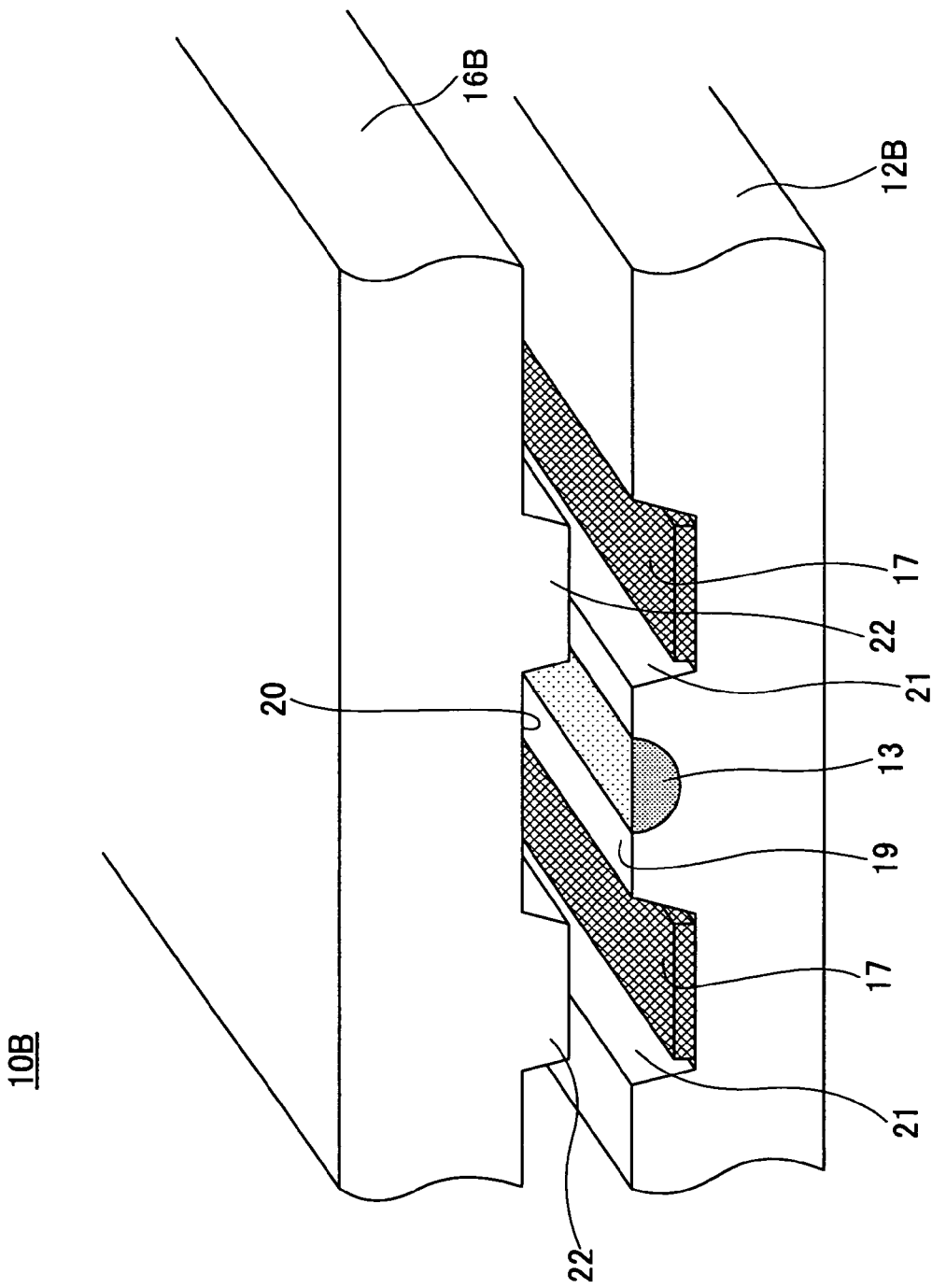
FIG. 8 is an exploded perspective and enlarged view of the main part of the waveguide type optical device of the second embodiment of the present invention.

FIG. 7 is a perspective and enlarged view of a main part of a waveguide type optical device 10B of the second embodiment of the present invention. FIG. 8 is an exploded perspective and enlarged view of the main part of the waveguide type optical device 10B of the second embodiment of the present invention. In FIG. 7 and FIG. 8, parts that are the same as the parts of the first embodiment of the present invention discussed with reference to FIG. 3 through FIG. 6 are given the same reference numerals, and explanation thereof is omitted.

In the waveguide type optical device 10A of the first embodiment of the present invention, the process supplemental plate 16A has a plate-shaped configuration. On the other hand, in the waveguide type optical device 10B of the second embodiment of the present invention, a groove forming part 21 for the adhesive 17 is formed in the substrate 12B and a convex part 22 inserted in the groove forming part 21 for the adhesive 17 is formed at the process supplemental plate 16B.

By provided the convex part 22 at the process supplemental plate 16B projecting to the substrate 12B, the facing surface 29 facing the waveguide 13 is sunken relatively. The adhesive 17 is provided in the groove forming part 21 of the substrate 12B and the convex part 22 is inserted in the groove forming part 21, so that the process supplemental plate 16B is attached to the substrate 12B and the process supplemental plate 16B and the substrate 12B are adhered to and fixed to each other.

At this time, since the process supplemental plate 16B is attach to the substrate 12B by inserting the convex part 22 in the groove forming part 21, it is possible to easily position the process supplemental plate 16B on the substrate 12B. Furthermore, since the convex part 22 inserted in the groove forming part 21 presses the adhesive 17 at the time of attaching the process supplemental plate 16B to the substrate 12B, the pressed adhesive 17 is moved to a side surface part of the groove forming part 21. Because of this, in the waveguide type optical device 10B of the second embodiment of the present invention, it is possible to increase an adhering area of the adhesive 17 between the convex part 22 and the groove forming part 21, so that the substrate 12B and the process supplemental plate 16B can be firmly adhered (fixed) to each other.

The distance indicated by an arrow ΔW in FIG. 7 between the waveguide 13 and the facing surface 20 of the process supplemental plate 16B is defined as $0 \leq \Delta W \leq 0.08 \times \lambda$ wherein "λ" is defined as a wavelength of light propagated in the waveguide 13. This distance ΔW can be changed where the depth of the grove forming part 21, the configuration of the groove forming part 21, a projection amount of the convex part 22, the configuration of the convex part 22, the amount of the adhesive 17, viscosity of the adhesive 17, and others are parameters. In the above-mentioned embodiment, the groove forming part 21 is formed in the substrate 12B, the adhesive 17 is provided in the groove forming part 21, and the convex part 21 inserted in the groove forming part 21 is formed at the process supplemental plate 16B. However, the present invention is not limited to this. The groove forming part for the adhesive can be formed in the process supplemental plate 16B, the adhesive can be provided in this groove forming part, and the convex part inserted in this groove forming part can be formed in the substrate 12B.

Figure 9:
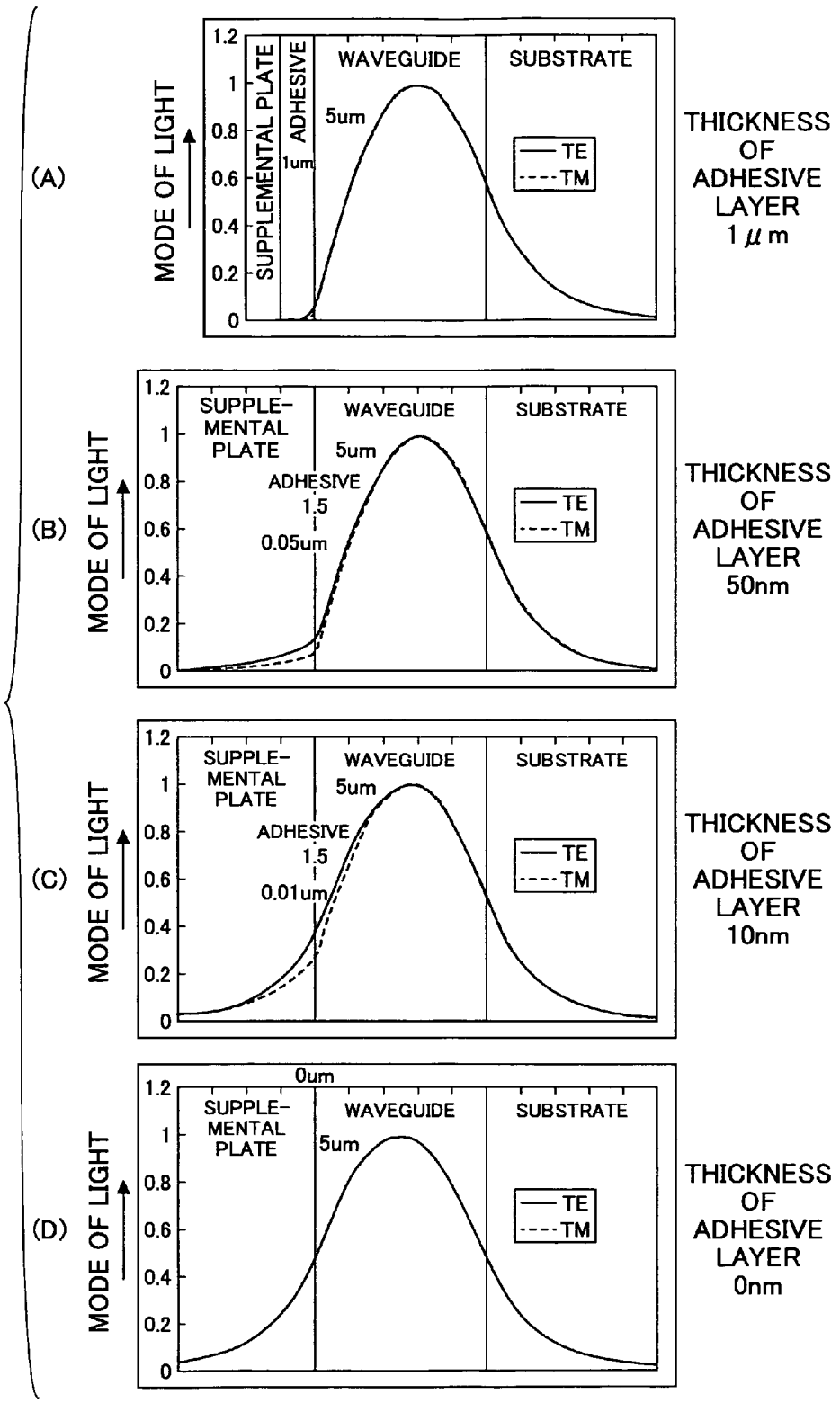
FIG. 9 is a graph showing relationships between thickness of adhesive layers (1 μm, 50 nm, 10 nm and 0 nm) and intensities (modes) of lights in the waveguide type optical devices.

Next, operations and effects of the waveguide type optical devices 10A and 10B having the above-discussed structures are discussed with reference to FIG. 9-(A) through FIG. 9-(D). Here, FIG. 9 is a graph showing relationships between thickness (1 μm, 50 nm, 10 nm and 0 nm) of adhesive layers provided between the waveguide and the process supplemental plate 16B and intensities (modes) of lights in the waveguide type optical devices. Since the waveguide type optical devices 10A and 10B have substantially the same characteristics, FIG. 9-(A) through FIG. 9-(D) are discussed by using a characteristic of the waveguide type optical device 10A as an example. In FIG. 9-(A) through FIG. 9-(D), TE modes are indicated by solid lines and TM modes are indicated by dotted lines. Furthermore, in FIG. 9-(A) through FIG. 9-(D), vertical axes indicate modes (intensities) of the light propagated in the waveguide type optical device. Horizontal axes indicate thickness of members forming the waveguide type optical device. In other words, widths of sections of the horizontal axes indicate thicknesses of the process supplemental plate 16B, the adhesive 17, the waveguide 13, and the substrate 12B from the left end in this order.

FIG. 9-(A) shows a characteristic when the thickness of the adhesive 17 is 1 μm (propagation optical wavelength ratio 1λ: "λ" is a wavelength of light). FIG. 9-(B) shows a characteristic when the thickness of the adhesive 17 is 50 nm (propagation optical wavelength ratio 0.05λ: "λ" is a wavelength of light). FIG. 9-(C) shows a characteristic when the thickness of the adhesive 17 is 100 nm (propagation optical wavelength ratio 0.01λ: "λ" is a wavelength of light). FIG. 9-(D) shows a characteristic when the thickness of the adhesive 17 is 0 nm, namely the adhesive 17 does not exist.

For the convenience of explanation, first a case shown in FIG. 9-(D) is discussed. As mentioned above, FIG. 9-(D) shows a case where there is no adhesive 17 between the waveguide 13 and the supplemental plate 16B. That is to say, FIG. 9-(D) shows a characteristic of the waveguide type optical device 10A (10B) of each of the embodiments of the present inventions. Since the adhesive 17 does not exist between the supplemental plate 16B and the waveguide 13, the mode (light path) of the light propagated in the waveguide type optical device 10A is not be obstructed by the adhesive 17. Because of this, the mode of the light propagated in the waveguide type optical device 10A is a mode spreading in a normal distribution in the substrate 12A and the process supplemental plate 16A where the waveguide 13 is a center.

Because of this, in the waveguide type optical device 10A having the characteristic shown in FIG. 9-(D), even if light enters from the waveguide 13 to the thin film insertion groove forming part 13, the light does not spread in the thin film insertion groove forming part 14. Therefore, the amount of light reentering the waveguide 13 after passing through the functional thin film 15 is not reduced and therefore coupling loss can be reduced.

FIG. 9-(A) shows a characteristic of the related art waveguide type optical device with an adhesive thickness of 1 μm. In a case where the adhesive 17 provided between the waveguide 13 and the process supplemental plate 16A is thick like the example shown in FIG. 9-(A), spreading of the light propagated in the waveguide optical device to the process supplemental plate 16A is obstructed by the adhesive 17, so that the mode of the light, namely the light path, is one-sided to the substrate 12A.

In other words, the existence of the adhesive 17 influences to the mode of the light propagated in the waveguide optical device, and thereby the mode of light is one-sided to the substrate 12A. In a case where spreading of the light propagated in the waveguide optical device is one-sided to the substrate, the light is spread when entering from the waveguide 13 to the thin film insertion groove forming part 14, so that the amount of light reentering the waveguide 13 after passing through the functional thin film 15 is reduced and therefore coupling loss is increased.

In the waveguide type optical device shown in FIG. 9-(B), the adhesive 17 has thickness of 50 nm. In the waveguide type optical device shown in FIG. 9-(C), the adhesive 17 has thickness of 10 nm. They are less than the thickness of the adhesive 17 of the waveguide type optical device shown in FIG. 9-(A). Because of this, influence of the adhesive on the mode of the light in the waveguide type optical devices shown in FIG. 9-(B) and FIG. 9-(C) is less than that in the waveguide type optical devices shown in FIG. 9-(A). Because of this, the light propagated in the waveguide type optical device is propagated in the process supplemental plate 16A. Leaning (skewing) of the mode of the light in the case shown in FIG. 9-(B) and FIG. 9-(C) is corrected more than the case shown in FIG. 9-(A). In addition, leaning of the mode of the light in the case shown in FIG. 9-(C) is corrected more than leaning of the mode of the light in the cases shown in FIG. 9-(B). Therefore, as thickness of the layer of the adhesive 17 is smaller, leaning of the mode of the light is corrected.

Figure 10:
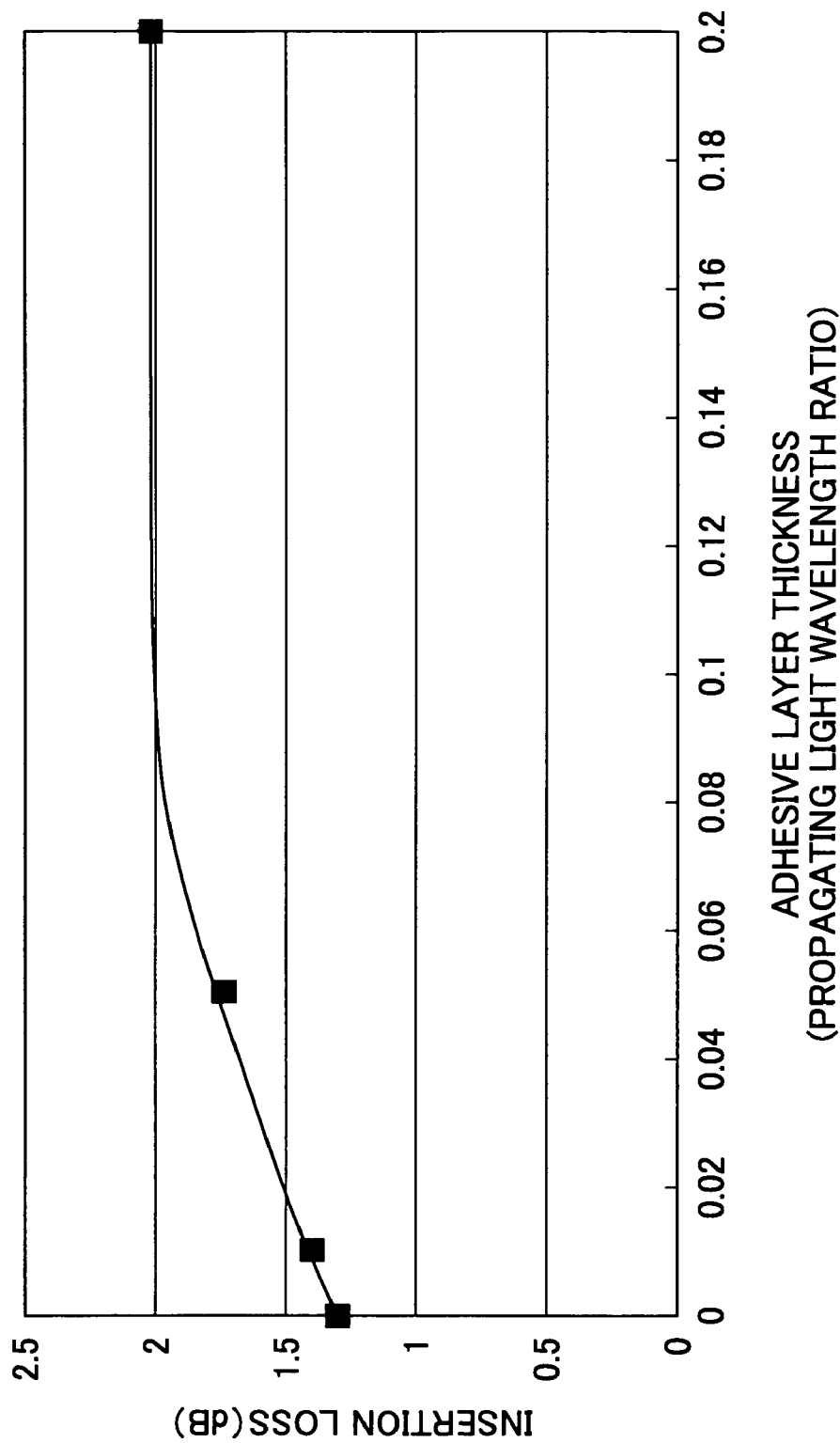
FIG. 10 is a graph showing a relationship between the thickness of the adhesive layer and insertion loss.

FIG. 10 is a graph showing the relationship between the thickness of the adhesive layer 17 between the waveguide 13 and the supplemental plate 16A and insertion loss of the waveguide type optical device. Here, "insertion loss" of the vertical axis of the graph indicates loss of light due to forming the thin film insertion groove forming part 14 and providing the functional thin film 15 in the waveguide type optical-device. In addition, "adhesive layer thickness" of the horizontal axis of the graph indicates a propagating light wavelength ratio that is a ratio between the thickness of the adhesive 17 and the wavelength of propagating light. For example, if the adhesive layer thickness is 0.1, the thickness of the adhesive 17 is defined as 0.1×λ wherein the wavelength of the propagating light is λ.

As shown in FIG. 10, in an area where the adhesive layer thickness exceeds 0.08, the insertion loss has a high value (approximately 2 dB). However, if the adhesive layer thickness is equal to or less than 0.08, the insertion loss is gradually decreased so that the coupling loss of the thin film insertion groove forming part 14 of the waveguide type optical device is reduced. In other words, when the distance indicated by an arrow ΔW in FIG. 7 between the waveguide 13 and the process supplemental plate 16A is 0≦ΔW≦0.08×λ wherein "λ" is defined as a wavelength of light propagated in the waveguide 13, the insertion loss of the waveguide type optical device 10A is decreased so that the coupling loss of the thin film insertion groove forming part 14 of the waveguide type optical device 10A can be reduced.

Next, a manufacturing method of the above-discussed waveguide type optical device 10A or 10B is discussed with reference to FIG. 11 and FIG. 12. While the manufacturing method of the waveguide type optical device 10A is discussed in the following explanation, the manufacturing method of the waveguide type optical device 10B is basically equivalent to the manufacturing method of the waveguide type optical device 10A. Here, FIG. 11 is a first view for explaining a manufacturing method of the waveguide type optical device of the embodiment of the present invention; and FIG. 12 is a second view for explaining the manufacturing method of the waveguide type optical device of the embodiment of the present invention.

Figure 11:
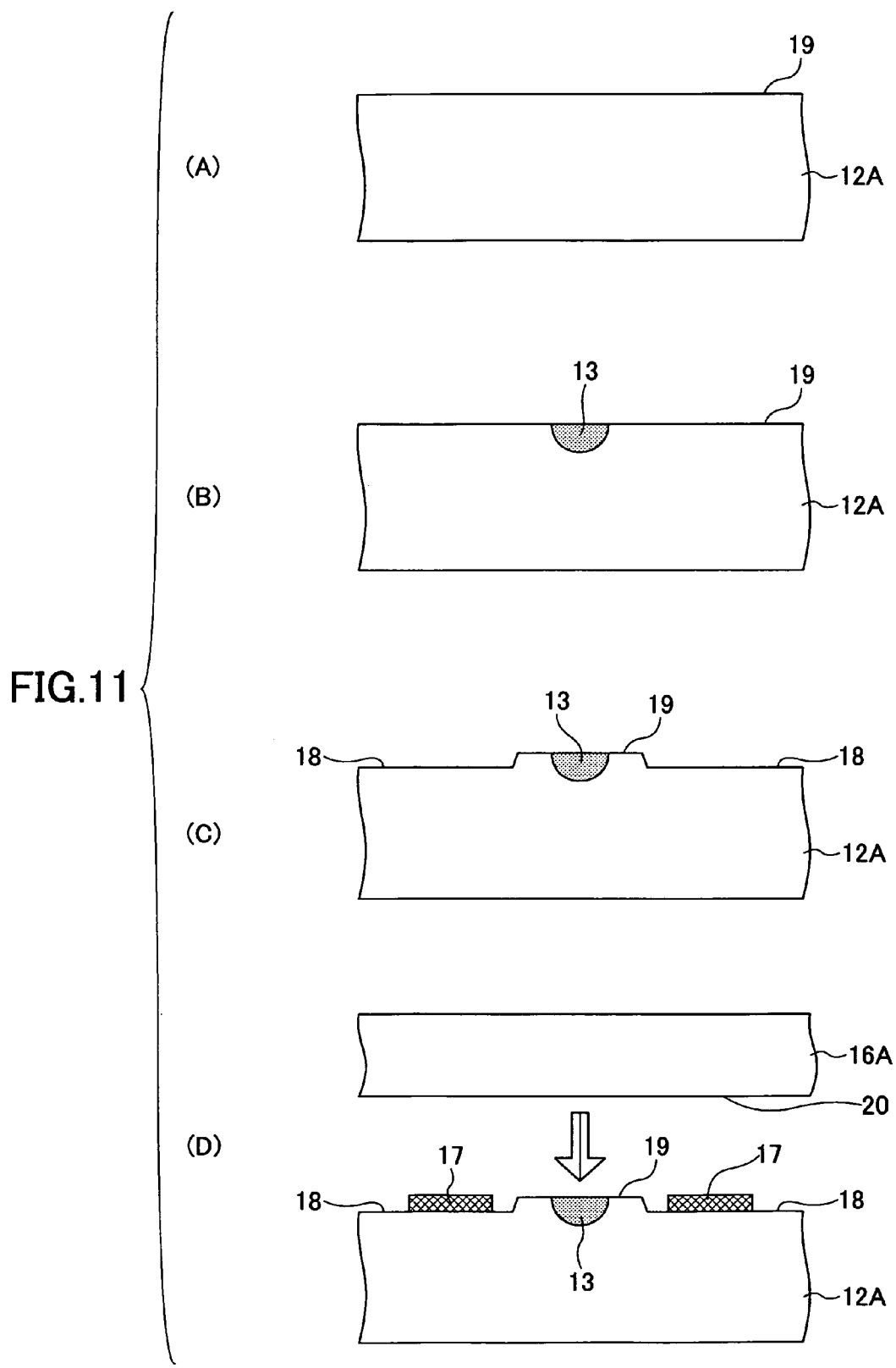
FIG. 11 is a first view for explaining a manufacturing method of the waveguide type optical device of the embodiment of the present invention.
Figure 12:
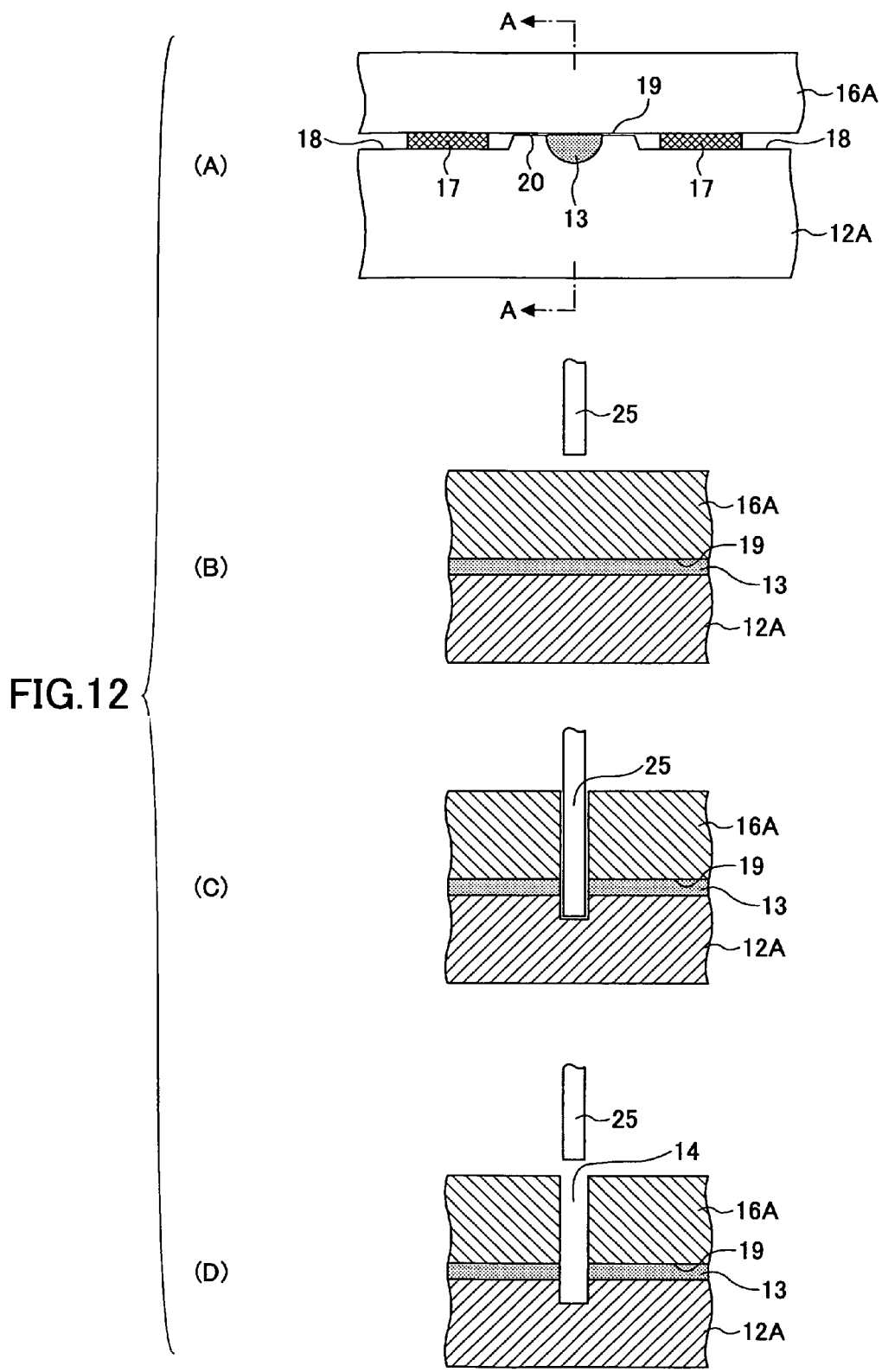
FIG. 12 is a second view for explaining the manufacturing method of the waveguide type optical device of the embodiment of the present invention.

In order to manufacture the waveguide type optical device 10A, as shown in FIG. 11-(A), first the flat plate-shaped substrate 12A made of LN is prepared. A substrate made of lithium tantalate instead of LN may be used. The waveguide forming surface 19 that is an upper surface in FIG. 11-(A) of the substrate 12A is polished to a mirror finish.

Next, as shown in FIG. 11-(B), the waveguide 13 is formed in the waveguide forming surface 19 of the substrate 12A by thermally diffusing titanium (Ti). The waveguide 13 may be formed by an ion exchange method instead of the thermal diffusion method. The waveguide 13 is formed in the longitudinal direction indicated by an arrow X in FIG. 3 of the substrate 12A.

Next, as shown in FIG. 11-(C), the concave part 18 is formed in the waveguide forming surface 19 of the substrate 12A. The concave part 18 is provided in a position excluding the forming position of the waveguide 13. In this embodiment, the concave part 18 is formed at both sides of the forming position of the waveguide 13. In addition, the concave part 18 is formed by an etching method and the depth of the concave part is approximately 2 μm. When the concave part 18 is formed, a resist not shown is provided at an upper part of the waveguide 13. Thus, it is possible to prevent generation of damage of the waveguide 13 due to the etching process.

In the meantime, while an example where the forming process of the waveguide 13 shown in FIG. 11-(B) is implemented and then the forming process of the concave part 18 shown in FIG. 11-(C) is implemented is discussed in this embodiment, the forming process of the concave part 18 may be implemented first and then the forming process of the waveguide 13 shown in FIG. 11-(B) may be implemented. In addition, while the depth of the concave part 18 is approximately 2 μm in this example, as discussed above, the depth of the concave part 18 can be properly adjusted based on the amount or viscosity of the adhesive 17.

After the waveguide 13 and the concave part 18 are formed, the adhesive 17 is provided in the concave part 18. In this example, the adhesive 17 is provided in a position of the substrate 12A excluding the forming position of the waveguide 13. The adhesive 17 is a thermosetting adhesive such as epoxy resin and applied by a dispenser or the like. Sheet adhesive can be used as the adhesive 17.

After the adhesive 17 is provided, as shown in FIG. 11-(D), the process supplemental plate 16A is provided on the substrate 12A. The process supplemental plate 16A is a substrate made of LN that is the same material as that of the substrate 12A. Therefore, the coefficient of thermal expansion and the refractive index of the process supplemental plate 16A are the same as those of the substrate 12A. In addition, a portion facing the waveguide 13 of the facing surface 20 of the process supplemental plate 16A is polished to a mirror finish in advance.

Next, a heating process is implemented so that the adhesive 17 undergoes thermosetting. As a result of this, the adhesive 17 is hardened by heat so that the process supplemental plate 16A is adhered and fixed to the substrate 12A. In this process, by adjusting the depth of the grove forming part 21, the configuration of the groove forming part 21, the projection amount of the convex part 22, the configuration of the convex part 22, the amount of the adhesive 17, the viscosity of the adhesive 17, and others, the distance $\Delta W$ between the waveguide 13 and the facing surface 20 of the process supplemental plate 16A is made to satisfy $0 \leq \Delta W \leq 0.08 \times \lambda$ wherein "$\lambda$" is defined as the wavelength of light propagated in the waveguide 13.

Thus, the distance $\Delta W$ between the waveguide 13 and the facing surface 20 of the process supplemental plate 16A is set so that the supplemental plate 16A and the waveguide 13 adhere to each other or come close to each other in a range not influencing a mode of light. The thickness of the adhesive 17 is equal to the depth of the concave part 18, namely approximately 2 μm.

After the process supplemental plate 16A is adhered to the substrate 12A, as shown in FIG. 12-(B) through FIG. 12-(D) which are cross-sectional views taken along the line A-A in FIG. 12-(A), the thin film insertion groove forming part 14 is formed by cutting through the process supplemental plate 16A to the substrate 12A by using a groove processing jig 25. By forming the thin film insertion groove forming part 14, the waveguide 13 formed in the substrate 12A is also cut.

As the groove processing jig 25, a dicing device used for semiconductor manufacturing, for example, can be used. In addition, width of the thin film insertion groove forming part 14 may be, for example, approximately 30 μm and depth of the thin film insertion groove forming part 14 may be, for example, approximately 0.3 mm.

Thus, even if the thin film insertion groove forming part 14 is formed by a mechanical process, since the process supplemental plate 16A is formed on the substrate 12A including a forming position of the waveguide 13, generation of damage such as chipping in a part of the waveguide 13 cut by the thin film insertion groove forming part 14 and its vicinity of the waveguide forming surface 19 can be prevented. If there is damage such as chipping in the waveguide 13 and its vicinity, the propagation characteristic of the light is degraded. However, in this example, since the generation of the damage is prevented, it is possible to prevent degradation of the propagation characteristic of the light.

In addition, in the waveguide type optical device 10A, the distance $\Delta W$ between the waveguide 13 and the facing surface 20 of the process supplemental plate 16A is selected so that the supplemental plate and the waveguide adhere to each other or come close to each other in a range not influencing a mode of light. More specifically, the distance $\Delta W$ between the waveguide 13 and the facing surface 20 of the process supplemental plate 16A is set satisfy $0 \leq \Delta W \leq 0.08 \times \lambda$ wherein "$\lambda$" is defined as the wavelength of light propagated in the waveguide 13. However, the adhesive 17 can be made thicker, regardless of the distance $\Delta W$, by providing the concave part 18. As a result of this, while the coupling characteristic of the waveguide type optical device 10A is kept small, the mechanical connection strength of the substrate 12A and the process supplemental plate 16A can be improved. Because of this, when the thin film insertion groove forming part 14 is mechanically processed by the groove processing jig 25, it is possible to securely prevent the cracks from being generated in the adhesive 17 and prevent the process supplemental plate 16A from separating from the substrate 12A.

The present invention is not limited to these embodiments, but variations and modifications may be made without departing from the scope of the present invention.

This patent application is based on Japanese Priority Patent Application No. 2006-249866 filed on Sep. 14, 2006, the entire contents of which are hereby incorporated by reference.

What is claimed is:

1. A waveguide type optical device, comprising:
   a substrate having a surface immediately upon which a waveguide core is formed;

a supplemental plate connected on the substrate by using an adhesive; and a groove forming part formed by cutting through the supplemental plate so as to reach the substrate and cut the waveguide core, the groove forming part being where a functional thin film is inserted;

wherein the supplemental plate and the waveguide core adhere to each other;

a convex part is formed in at least one of a position of the substrate excluding a forming position of the waveguide core;

a concave part is formed in a position, facing the convex part, of the supplemental plate;

a height of the convex part is greater than a depth of the concave part;

a width of the convex part is equal to or smaller that a width of the concave part;

a width direction of the convex part is the same as a width direction of the waveguide core; and the adhesive is provided in concave part so that the substrate and the supplemental plate are adhered to and fixed to each other.

2. The waveguide type optical device as claimed in claim 1, wherein the convex part, projecting to the concave part formed in one of the substrate and the supplemental plate, is provided at the other of the supplemental plate and the substrate.

3. The waveguide type optical device as claimed in claim 1, wherein the substrate is made of lithium niobate or lithium tantalate.

4. The waveguide type optical device as claimed in claim 1, wherein the supplemental plate is made of material having the same coefficient of thermal expansion and refractive index as a material of the substrate.

5. The waveguide type optical device as claimed in claim 1, wherein the supplemental plate is made of material the same as a material of the substrate.

6. The waveguide type optical device as claimed in claim 1, wherein the supplemental plate is formed in the entirety of a forming area of the waveguide.

7. A waveguide type optical device, comprising:

a substrate having a surface immediately upon which a waveguide core is formed;

a supplemental plate connected on the substrate by using an adhesive; and a groove forming part formed by cutting through the supplemental plate so as to reach the substrate and cut the waveguide core, the groove forming part being where a functional thin film is inserted, wherein:

the supplemental plate and the waveguide core adhere to each other or come close to each other in a range not influencing a mode of light;

a convex part is formed in at least one of a position of the substrate excluding a forming position of the waveguide core;

a concave part is formed in a position, facing the convex part, of the supplemental plate;

a height of the convex part is greater than a depth of the concave part;

a width of the convex part is equal to or smaller than a width of the concave part;

a width direction of the convex part is the same as a width direction of the waveguide core; and the adhesive is provided in the concave part so that the substrate and the supplemental plate are adhered to and fixed to each other.

* * * * *